US012597056B2

(12) United States Patent  
Takatsura et al.

(10) Patent No.: US 12,597,056 B2  
(45) Date of Patent: Apr. 7, 2026

(54) VEHICLE SEAT ORDERING SYSTEM AND SEAT FOR MEASUREMENT

(71) Applicant: TOYOTA BOSHOKU KABUSHIKI KAISHA, Aichi (JP)

(72) Inventors: Hiraku Takatsura, Aichi (JP); Sumi Takano, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 556 days.

(21) Appl. No.: 17/745,414

(22) Filed: May 16, 2022

(65) Prior Publication Data

US 2022/0374957 A1 Nov. 24, 2022

(30) Foreign Application Priority Data

May 19, 2021 (JP) ................................. 2021-084763

(51) Int. Cl.  
*G06Q 30/0601* (2023.01)

(52) U.S. Cl.  
CPC ..... *G06Q 30/0621* (2013.01); *G06Q 30/0635* (2013.01)

(58) Field of Classification Search  
CPC ........... G06Q 30/0621; G06Q 30/0635; B60N 2/0268  
See application file for complete search history.

(56) References Cited

U.S. PATENT DOCUMENTS

| | | | |
|---|---|---|---|
| 4,655,505 A | 4/1987 | Kashiwamura et al. | |
| 2012/0086249 A1 | 4/2012 | Hotary et al. | |

| | | | |
|---|---|---|---|
| 2012/0105241 A1* | 5/2012 | Griffin | B60R 21/01522 |
| | | | 340/667 |
| 2014/0309035 A1* | 10/2014 | Crawford | A63F 13/285 |
| | | | 463/36 |
| 2016/0123793 A1* | 5/2016 | Kolich | G01G 19/4142 |
| | | | 177/136 |
| 2016/0229126 A1* | 8/2016 | Every | A47C 7/029 |

(Continued)

FOREIGN PATENT DOCUMENTS

| | | |
|---|---|---|
| JP | 2002-253392 A | 9/2002 |
| JP | 2002279251 A | 9/2002 |

(Continued)

OTHER PUBLICATIONS

The perfect armchair: a brand already develops driver-made seats with 3D printing. Translated by ContentEngine LLC. CE Noticias Financieras, English ed. [Miami] Apr. 30, 2020. (Year: 2020).*

(Continued)

*Primary Examiner* — Michael Misiaszek  
(74) *Attorney, Agent, or Firm* — Greenblum & Bernstein, P.L.C.

(57) ABSTRACT

Provided is a vehicle seat ordering system that allows to design a custom-made seat suitable for a driving environment of a vehicle. One aspect of the present disclosure is a vehicle seat ordering system including: a seat for measurement, the seat including a seat body configured to be installed in a vehicle, and a sensor configured to detect a posture of an occupant of the seat body while the vehicle is running; and a seat design device configured to design a custom-made seat to be installed in the vehicle based on chronological data of the posture of the occupant obtained from the sensor.

7 Claims, 4 Drawing Sheets

(56)     References Cited

U.S. PATENT DOCUMENTS

| | | | |
|---|---|---|---|
| 2017/0043681 A1* | 2/2017 | Seiller | B60N 2/002 |
| 2017/0052682 A1* | 2/2017 | Agsteiner | G06Q 30/0621 |
| 2017/0103160 A1* | 4/2017 | Hynes | G09B 9/058 |
| 2017/0364984 A1* | 12/2017 | Hughes | G06Q 30/0623 |
| 2018/0208334 A1* | 7/2018 | McCarley | B64G 1/62 |
| 2020/0077803 A1 | 3/2020 | Hayashi | |
| 2020/0276949 A1* | 9/2020 | Baudu | B60N 2/002 |

FOREIGN PATENT DOCUMENTS

| | | |
|---|---|---|
| JP | 2016199267 A | 12/2016 |
| JP | 2020039674 A | 3/2020 |

OTHER PUBLICATIONS

Comfortable automotive seat design and big data analytics: A study in thigh support. Megan Romelfanger, Michael Kolich. Applied Ergonomics, vol. 75, 2019, pp. 257-262, ISSN 0003-6870, (Year: 2019).*

Chinese Second Office Action issued on Oct. 20, 2023 in the corresponding Chinese patent application No. 202210534511.6 and machine-generated English translation.

Chinese First Office Action issued on Apr. 23, 2023 in the corresponding Chinese patent application No. 202210534511.6 and machine-generated English translation.

Notice of Reasons for Refusal issued on Jul. 2, 2024 in the corresponding Japanese patent application No. 2021-084763 and its machine-generated English translation.

Japanese Office Action issued on Oct. 22, 2024 in the corresponding Japanese patent application No. 2021-084763 and machine-generated English translation thereof.

Japanese Office Action in counterpart Japanese Application No. 2021-084763, dated Jun. 10, 2025 (and translation thereof.).

\* cited by examiner

VEHICLE SEAT ORDERING SYSTEM AND SEAT FOR MEASUREMENT

CROSS-REFERENCE TO RELATED APPLICATIONS

This application claims the benefit of priority based on Japanese patent application No. 2021-084763 filed on May 19, 2021 with the Japan Patent Office and the entire disclosure of which is incorporated herein by reference.

BACKGROUND

The present disclosure relates to a vehicle seat ordering system and a seat for measurement.

An ordering system in which a seat to be installed in a vehicle is customized in accordance with a user's request is known (see JP2002-253392A). In this ordering system, a seat can be customized by the user by adjusting a robot seat.

SUMMARY

The robot seat of the above-mentioned ordering system is installed in a shop or other facility, and the robot seat is adjusted in a static state. Thus, it is impossible to customize the seat in consideration of a driving environment of the vehicle in which the seat is actually installed.

In one aspect of the present disclosure, it is preferable to provide a vehicle seat ordering system that allows to design a custom-made seat suitable for a driving environment of a vehicle.

One aspect of the present disclosure is a vehicle seat ordering system including: a seat for measurement, the seat including a seat body configured to be installed in a vehicle, and a sensor configured to detect a posture of an occupant of the seat body while the vehicle is running; and a seat design device configured to design a custom-made seat to be installed in the vehicle based on chronological data of the posture of the occupant obtained from the sensor.

According to such configuration, in the user vehicle in which the custom-made seat is to be installed, the posture change of the occupant caused by running of the user vehicle is obtained by the sensor of the seat for measurement. Thus, with the seat design device, it is possible to design the custom-made seat that is suitable for a driving environment, such as a shape and an undulation of a road where the vehicle actually runs and a running speed on the road. In addition, it is possible to reduce the amount of time when the user is restricted during the designing the custom-made seat.

In one aspect of the present disclosure, based on the chronological data and specifications of the custom-made seat, the seat design device may be configured to create performance confirmation data that makes it possible to compare a posture change of the occupant of the seat for measurement while the vehicle is running with a posture change of the occupant of the custom-made seat while the vehicle is running. According to such configuration, the user can visually understand the improvement in seating comfort obtained by the custom-made seat. This improves user convenience in a procedure for ordering the custom-made seat.

In one aspect of the present disclosure, the sensor may be configured to detect pressure received by the seat body from the occupant and acceleration generated in the seat body. According to such configuration, the seat for measurement has a relatively simple configuration, thereby making it easy to install the seat for measurement in the vehicle.

In one aspect of the present disclosure, the seat design device may be configured to execute a processing to transmit design information including the specifications of the custom-made seat to a user terminal and a processing to receive an order for the custom-made seat from the user terminal. According to such configuration, the user can confirm the specifications of the custom-made seat and can place an order for the custom-made seat without visiting a shop after the design of the custom-made seat is completed.

In one aspect of the present disclosure, the seat design device may be configured to execute a processing to select an initial shape of the seat for measurement by an instruction from the user terminal. According to such configuration, it is possible to expand the range of customization made by the user for the custom-made seat.

Another aspect of the present disclosure is a seat for measurement, the seat including: a seat body configured to be installed in a vehicle; and a sensor configured to detect a posture of an occupant of the seat body while the vehicle is running. The sensor is configured to transmit a detected posture of the occupant to a seat design device configured to design a custom-made seat to be installed in the vehicle.

According to such configuration, the seat for measurement is installed in a vehicle in which a custom-made seat is to be installed, whereby the sensor can obtain the occupant's posture that is changed while the vehicle is running. Thus, it is possible to design the custom-made seat that is suitable for the driving environment, such as the shape and the undulation of the road where the vehicle actually runs and the running speed on the road.

BRIEF DESCRIPTION OF THE DRAWINGS

Some embodiments to which the present disclosure is applied will be described hereinafter by way of example with reference to the accompanying drawings, in which.

DETAILED DESCRIPTION OF EXEMPLARY EMBODIMENTS

1. First Embodiment

1-1. Configuration

Figure 1:
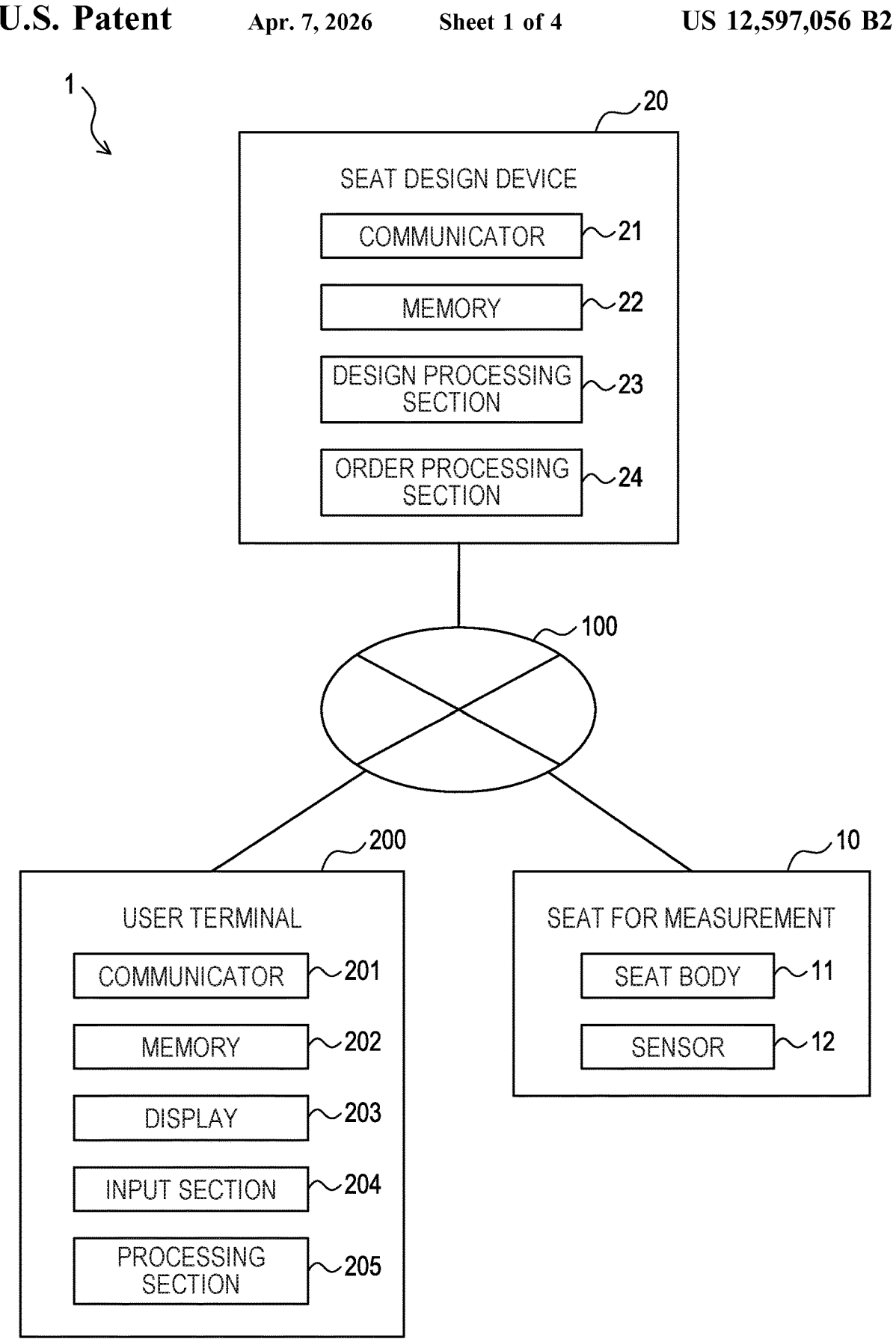
FIG. 1 is a schematic diagram showing a vehicle seat ordering system in an embodiment.

A vehicle seat ordering system 1 shown in FIG. 1 is a system that allows a user to order a preferred custom-made seat as a vehicle seat to be installed in a user's own vehicle (hereinafter, also referred to as "user vehicle").

The custom-made seat is customized according to the physique of the user and the driving environment of the user vehicle so as to improve the seating comfort for the user. The vehicle seat ordering system 1 includes a seat for measurement 10 and a seat design device 20.

<Seat for Measurement>

Figure 2:
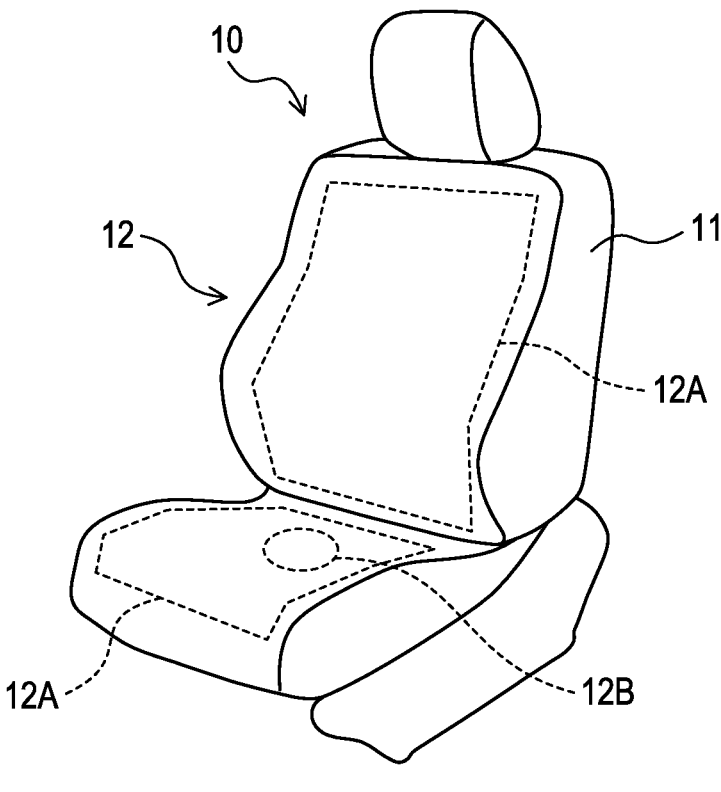
FIG. 2 is a schematic diagram of a seat for measurement in FIG. 1.

The seat for measurement 10 is a seat for measuring a posture change of the user (i.e., an occupant) under the driving environment of the user vehicle. The seat for measurement 10 includes a seat body 11 and a sensor 12 as shown in FIG. 2.

The seat body 11 is configured to be installed in the user vehicle. The seat body 11 is temporary installed in the vehicle interior of the user vehicle (e.g., in the driver's seat or the passenger seat) in place of a custom-made seat to be installed in the future. The user is seated on the seat body 11 and uses the user vehicle for a certain period of time.

The sensor 12 is configured to detect a posture of the occupant of the seat body 11 while the user vehicle is running and to send the detected posture to the seat design device 20. The "posture of the occupant" includes, in addition to a position of the occupant's body, acceleration generated in the occupant when the user vehicle is accelerated and decelerated and the user vehicle passes through a curve.

Specifically, the sensor 12 includes a pressure sensor 12A configured to detect pressure received by the seat body 11 from the occupant and an acceleration sensor 12B configured to detect acceleration generated in the seat body 11.

The pressure sensor 12A detects a pressure distribution of the occupant of the seat body 11. The pressure sensors 12A are arranged in a seat cushion and a seatback of the seat body 11. The acceleration sensor 12B detects the acceleration generated in the seat body 11 in a front-rear direction and a left-right direction. Note that the acceleration sensor 12B may be arranged outside the seat body 11.

As shown in FIG. 1, the sensor 12 is configured to transmit data indicating the detected posture of the occupant (i.e., the magnitude of the pressure and the acceleration) to the seat design device 20 through a network 100 such as the Internet.

The sensor 12 may directly communicate with the seat design device 20 or may communicate with the seat design device 20 through a user terminal 200. The sensor 12 may also communicate with the seat design device 20 through ECU (electronic control unit) of the user vehicle. For example, the sensor 12 can communicate with the user terminal 200 or the ECU of the user vehicle using wired communication or near field wireless communication.

The sensor 12 transmits the collected data to the seat design device 20 directly or through other device at regular intervals (i.e., every week). The sensor 12 includes an internal power supply for detection and communication.

<Seat Design Device>

The seat design device 20 is configured to design a custom-made seat to be installed in the user vehicle based on chronological data of the posture of the occupant (i.e., a user) obtained from the sensor 12.

The seat design device 20 is a network server arranged outside the user vehicle (i.e., in a ground facility). The seat design device 20 is configured of a computer provided with, for example, a processor, a storage medium such as RAM and ROM, and an input/output portion. The seat design device 20 includes a communicator 21, a memory 22, a design processing section 23, and an order processing section 24.

The communicator 21 transmits and receives data to and from the seat for measurement 10 and the user terminal 200. Specifically, the communicator 21 receives the chronological data of the posture from the sensor 12 of the seat for measurement 10. The communicator 21 also receives user information and an ordering command from the user terminal 200 and transmits design information of the custom-made seat to the user terminal 200.

The memory 22 stores registration information of the user, data obtained from the sensor 12, specifications (i.e., specs) of the custom-made seat, and the like.

The design processing section 23 is configured to design a custom-made seat optimized for a user based on the physique of the user included in the registration information of the user and the chronological data of the posture of the user obtained from the sensor 12.

Specifically, the design processing section 23 designs the custom-made seat that fits to the physique of the user and that reduces the movement of the user's body caused by acceleration under the driving environment of the user vehicle. The specs of the custom-made seat are determined by, for example, artificial intelligence, functions, tables, and other calculators obtained by means of statistical methods, such as a reinforcement learning. The calculator describes a correlation between a shape of the custom-made seat and the movement of the user's body.

The design of the custom-made seat includes adjustment or selection of shapes or materials of pads forming the seat cushion and the seatback (e.g., hardness and density). Also, the custom-made seat is customized based on an initial shape of the seat for measurement 10 described below.

The design processing section 23 also reflects user's desired skin design (e.g., material, color, and pattern) in the specifications of the custom-made seat. The skin design is selected using the user terminal 200.

After designing the custom-made seat, the design processing section 23 creates performance confirmation data for the user to confirm the performance of the custom-made seat. The performance confirmation data is created based on the chronological data outputted from the sensor 12 and the specifications of the custom-made seat designed by the design processing section 23.

The performance confirmation data is simulation data that makes it possible to compare the posture change of the occupant of the seat for measurement 10 while the user vehicle is running with the posture change of the occupant of the custom-made seat while the user vehicle is running.

Specifically, the performance confirmation data includes body pressure change data and human body behavior data. The body pressure change data is data showing a change in the body pressure distribution of the occupant of each of the seat for measurement 10 and the custom-made seat while the user vehicle is running. The change in the body pressure distribution is calculated based on the body pressure distribution obtained from the sensor 12. With the body pressure change data, the user can confirm suppression performance of the body pressure distribution change in the custom-made seat.

The human body behavior data is data showing a movement of the occupant's body while the user vehicle is running. The movement of the occupant's body is calculated based on the acceleration obtained from the sensor 12. With the human body behavior data, the user can confirm suppression performance of sensible acceleration in the custom-made seat.

As a part of the performance confirmation data, the design processing section 23 also creates appearance design data of the custom-made seat that reflects the skin design selected by the user. The appearance design data is image data of the outer appearance of the custom-made seat.

The design processing section 23 transmits the design information of the custom-made seat to the user terminal 200 linked to the seat for measurement 10, from which the data was obtained, through the communicator 21. The design information of the custom-made seat includes the specifications of the custom-made seat and the performance confirmation data.

The order processing section 24 is configured to execute an initial shape selection processing and an order reception processing.

In the initial shape selection processing, the order processing section 24 selects the initial shape of the seat for measurement 10 by an instruction from the user terminal 200. The initial shape is selected from, for example, a standard type, a sports type, and an intermediate type between the standard type and the sports type. The order processing section 24 also selects the skin design of the custom-made seat by an instruction from the user terminal 200.

The initial shape selection processing is executed before the seat for measurement 10 is installed in the user vehicle. The order processing section 24 transmits the initial shape selected in the initial shape selection processing to a terminal of a service provider providing the seat for measurement 10. The service provider prepares a seat for measurement 10 having the selected initial shape and sends it to the user or to a dealer handling the user vehicle.

In the order reception processing, the order processing section 24 receives an order for the custom-made seat from the user terminal 200. The order reception processing is executed after the design of the custom-made seat is completed by the design processing section 23.

Upon receipt of the order from the user terminal 200, the order processing section 24 transmits a production instruction of the custom-made seat to the terminal of the service provider. The service provider produces the custom-made seat whose production instruction has received, and sends the custom-made seat to the user or the dealer.

<User Terminal>

The user terminal 200 is a portable computer configured of, for example, a processor, a storage medium such as RAM and ROM, and an input/output portion.

Examples of the user terminal 200 may include smartphones, tablets, and laptops. The user terminal 200 includes a communicator 201, a memory 202, a display 203, an input section 204, and a processing section 205.

The communicator 201 communicates with the seat design device 20 through the network 100. The memory 202 stores an application program to transmit and receive data to and from the seat design device 20. The display 203 is a display showing text and images. The input section 204 is an input device, such as a touch panel, a keyboard, and a mouse.

The processing section 205 executes a user information input processing, a design information display processing, and an order processing.

In the user information input processing, the processing section 205 receives input of personal information, such as the name, address, e-mail address, age, gender, height, and weight of the user. The processing section 205 transmits the personal information inputted from the input section 204 to the seat design device 20 and registers for membership.

In the user information input processing, the processing section 205 displays, on the display 203, images of the initial shapes of the seats for measurement 10 for each type and images of the skin designs. The processing section 205 transmits an initial shape and a skin design selected using the input section 204 to the seat design device 20.

In the design information display processing, the processing section 205 displays, on the display 203, the design information transmitted from the seat design device 20. Specifically, the specifications, the performance confirmation data, and the price of the custom-made seat are displayed on the display 203.

In the order processing, the processing section 205 outputs an ordering command to the seat design device 20 upon receipt of input of an order from the input section 204. The processing section 205 also processes an electronic payment of the cost of the custom-made seat together with the ordering command.

<Method of Using the Vehicle Seat Ordering System>

Hereinafter, a vehicle seat ordering service using the vehicle seat ordering system 1 will be described.

First of all, the user installs an application to use the vehicle seat ordering service in the user terminal 200. After installing the application, the user registers for membership to the service through the application. Then, the user selects the initial shape of the seat for measurement 10 and the skin design in the application.

Figure 3A:
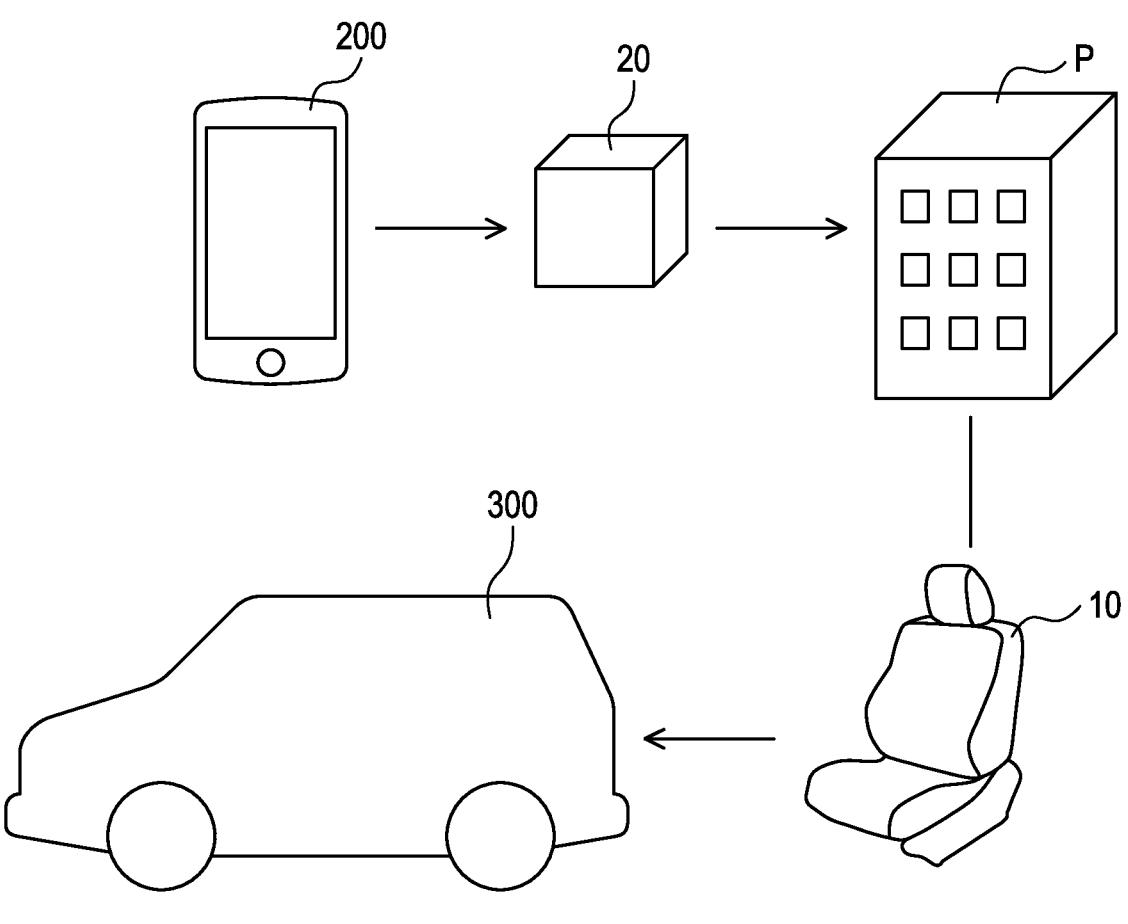
FIG. 3A is a schematic diagram showing steps in the vehicle seat ordering system in FIG. 1.

As shown in FIG. 3A, the information inputted into the user terminal 200 by the user is transmitted to the seat design device 20. A service provider P prepares the seat for measurement 10 having the initial shape selected by the user and sends it to the user. The user installs the delivered seat for measurement 10 in the user vehicle 300. Note that the service provider P may send the seat for measurement 10 to a place (e.g., a dealer) other than the user's residence.

Figure 3B:
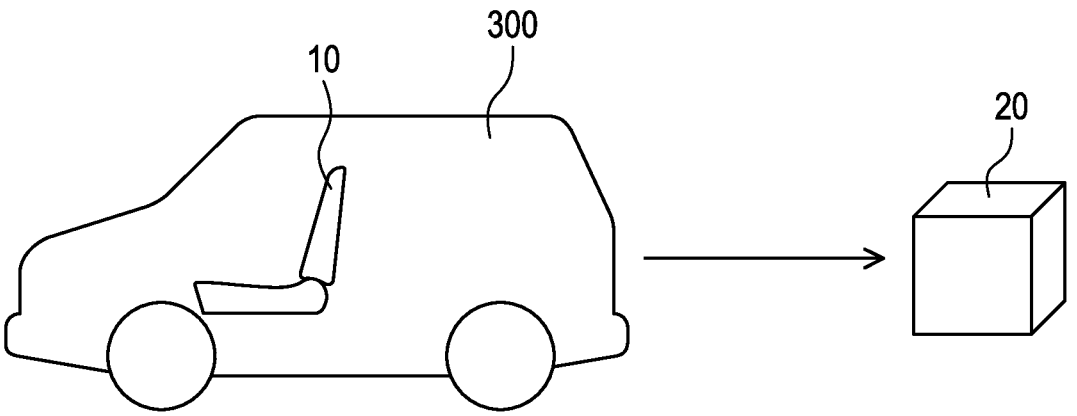
FIG. 3B is a schematic diagram showing next steps followed by FIG. 3A.

The user drives the user vehicle 300, with the seat for measurement 10 installed therein, on a daily basis for commuting and going for a drive during a predetermined measurement period (e.g., two weeks). As shown in FIG. 3B, during the measurement period, the seat for measurement 10 transmits the chronological data detected by the sensor 12 to the seat design device 20.

Figure 4A:
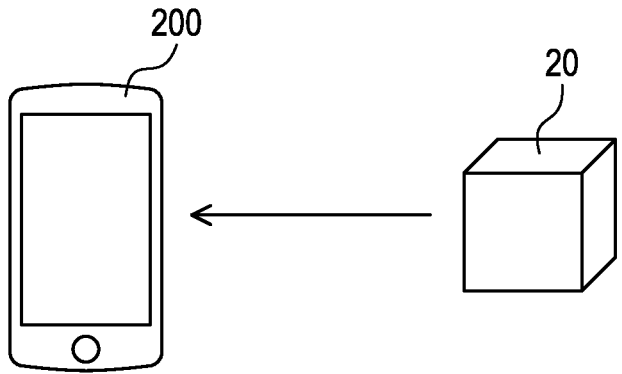
FIG. 4A is a schematic diagram showing next steps followed by FIG. 3B.

As shown in FIG. 4A, after the measurement period has elapsed, the seat design device 20 creates the specifications and the performance confirmation data of the custom-made seat and transmits them to the user terminal 200. The specifications and the performance confirmation data of the custom-made seat are displayed in the application.

Figure 4B:
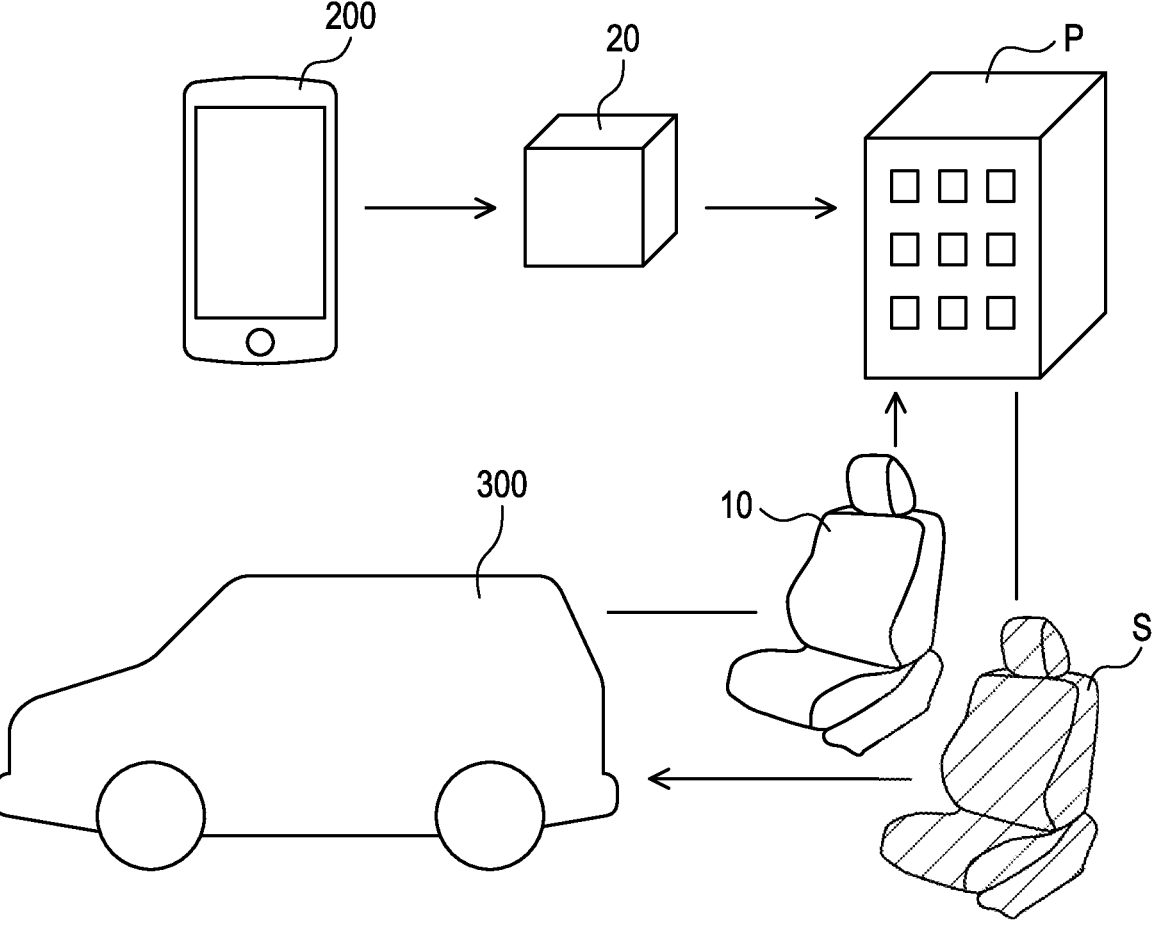
FIG. 4B is a schematic diagram showing next steps followed by FIG. 4A.

If the user agrees to the specifications of the custom-made seat, the user performs an ordering operation in the application in the user terminal 200. As shown in FIG. 4B, upon receipt of the ordering operation, the seat design device 20 instructs the service provider P to produce the custom-made seat.

The service provider P sends the produced custom-made seat S to the user. The user installs the received custom-made seat S in the user vehicle 300. The user returns the seat for measurement 10 to the service provider P.

1-2. Effects

According to the above-described embodiment, the following effects can be obtained.

(1a) In the user vehicle in which the custom-made seat is to be installed, the posture change of the occupant caused by the running of the user vehicle are obtained by the sensor 12 of the seat for measurement 10. Thus, with the seat design device 20, it is possible to design the custom-made seat that is suitable for the driving environment, such as the shape and the undulation of the road where the user vehicle actually runs and the running speed on the road. In addition, it is possible to reduce the amount of time when the user is restricted during the designing of the custom-made seat.

(1b) Since the seat design device 20 creates the performance confirmation data that makes it possible to compare the seat for measurement 10 with the custom-made seat, the user can visually understand an improvement in seating comfort obtained by the custom-made seat. This improves user convenience in the procedure for ordering the custom-made seat.

(1c) Since the sensor 12 is configured to detect pressure and acceleration, the seat for measurement 10 has a relatively simple configuration. This makes it easily to install the seat for measurement 10 in the user vehicle.

(1d) By transmitting the design information of the custom-made seat to the user terminal 200 and by receiving an order from the user terminal 200, the user can confirm the specifications of the custom-made seat and place an order for the custom-made seat without visiting a shop after the design of the custom-made seat is completed.

(1e) Since the initial shape of the seat for measurement 10 is selectable, it is possible to expand the range of customization made by the user for the custom-made seat.

2. Other Embodiments

Although the embodiment of the present disclosure has been described above, it is needless to say that the present disclosure is not limited to the above embodiment and can take various forms.

(2a) In the vehicle seat ordering system of the above described embodiment, the seat design device does not necessarily have to create the performance confirmation data of the custom-made seat. For example, the seat design device may provide only the specifications of the custom-made seat to the user.

(2b) In the vehicle seat ordering system of the above-described embodiment, the sensor does not necessarily have to detect the pressure and the acceleration as the posture of the occupant. The sensor may obtain data other than the pressure and the acceleration. For example, the sensor may obtain the posture of the occupant as an image. The sensor may also detect the weight of the occupant.

(2c) In the vehicle seat ordering system of the above-described embodiment, the seat design device does not necessarily have to be configured to communicate with the user terminal. For example, the seat design device may be configured to directly receive, from the user, the input of information and the order for the custom-made seat. In this case, the seat design device is installed, for example, in a dealer who sells vehicles.

(2d) A function served by a single element in any of the above-described embodiments may be achieved by a plurality of elements, or a function served by a plurality of elements may be achieved by a single element. Furthermore, a part of the configurations of the aforementioned embodiments may be omitted. At least part of the configurations of the aforementioned embodiments may also be added to or replaced with the configurations of the other above-described embodiments. It should be noted that all modes included in the technical idea specified from the wording described in the claims are embodiments of the present disclosure.

What is claimed is:

1. A vehicle seat ordering system comprising:
a seat for measurement, the seat including a seat body configured to be installed in a vehicle, and a sensor configured to detect a posture of an occupant of the seat body while the vehicle is running; and
a seat design device configured to design a custom-made seat to be installed in the vehicle utilizing chronological data of the posture of the occupant obtained from the sensor, the custom-made seat including a seat cushion and a seatback,
wherein, utilizing the chronological data and specifications of the custom-made seat, the seat design device is configured to create performance confirmation data,
wherein the performance confirmation data includes body pressure change data and human body behavior data,
the body pressure change data is data showing a change in body pressure distribution of the occupant of each of the seat for measurement and the custom-made seat while the vehicle is running, and
the human body behavior data is data showing a movement of the occupant's body while the vehicle is running, and
wherein the design of the custom-made seat includes adjustment or selection of shapes or materials of pads forming the seat cushion and the seatback.

2. The vehicle seat ordering system according to claim 1,
wherein the performance confirmation data makes it possible to compare a posture change of the occupant of the seat for measurement while the vehicle is running with a posture change of the occupant of the custom-made seat while the vehicle is running.

3. The vehicle seat ordering system according to claim 1,
wherein the sensor is configured to detect pressure received by the seat body from the occupant and acceleration generated in the seat body.

4. The vehicle seat ordering system according to claim 1,
wherein the seat design device is configured to execute
a processing to transmit design information including the specifications of the custom-made seat to a user terminal and
a processing to receive an order for the custom-made seat from the user terminal.

5. The vehicle seat ordering system according to claim 1,
wherein the seat design device includes a memory that stores registration information of the occupant, and configured to design the custom-made seat utilizing physique of the occupant included in the registration information and the chronological data of the posture of the occupant obtained from the sensor.

6. The vehicle seat ordering system according to claim 1,
wherein the seat design device is configured to further create appearance design data of the custom-made seat as the performance confirmation data.

7. The vehicle seat ordering system according to claim 3,
wherein the sensor is configured to detect acceleration generated in the seat body in a front-rear direction and a left-right direction.

* * * * *